United States Patent
McUmber et al.

(10) Patent No.: US 7,471,196 B2
(45) Date of Patent: *Dec. 30, 2008

(54) BUSINESS PROCESS FOR DISSEMINATING PILOT WEATHER DATA BY VOICE

(75) Inventors: William E. McUmber, Rives Junction, MI (US); Marilyn Wulfekuhler, Lansing, MI (US)

(73) Assignee: Mackinac Software, LLC, Lansing, MI (US)

( * ) Notice: Subject to any disclaimer, the term of this patent is extended or adjusted under 35 U.S.C. 154(b) by 289 days.

This patent is subject to a terminal disclaimer.

(21) Appl. No.: 11/483,694

(22) Filed: Jul. 10, 2006

(65) Prior Publication Data

US 2007/0184821 A1    Aug. 9, 2007

Related U.S. Application Data

(63) Continuation-in-part of application No. 10/978,872, filed on Oct. 29, 2004, now Pat. No. 7,088,241.

(60) Provisional application No. 60/516,160, filed on Oct. 31, 2003.

(51) Int. Cl.
G08B 1/08    (2006.01)
H04Q 7/00    (2006.01)

(52) U.S. Cl. ............... 340/539.28; 340/949; 455/414.3; 379/88.17; 379/88.23

(58) Field of Classification Search ................. 340/949, 340/968, 945, 539.28; 455/414.3; 702/3; 379/88.13, 88.23, 88.17

See application file for complete search history.

(56) References Cited

U.S. PATENT DOCUMENTS

| 4,295,139 | A | * | 10/1981 | Arpino | 340/870.01 |
| 5,323,565 | A | * | 6/1994 | Kappers et al. | 52/36.4 |
| 5,757,322 | A | * | 5/1998 | Ray et al. | 342/460 |
| 6,181,260 | B1 | * | 1/2001 | Simon et al. | 340/949 |
| 6,590,529 | B2 | * | 7/2003 | Schwoegler | 342/357.13 |
| 6,675,098 | B2 | * | 1/2004 | Peek et al. | 702/3 |
| 6,828,922 | B1 | * | 12/2004 | Gremmert et al. | 340/949 |
| 6,968,187 | B1 | * | 11/2005 | Irwin et al. | 455/431 |

* cited by examiner

*Primary Examiner*—Benjamin C Lee
*Assistant Examiner*—Hoi C Lau
(74) *Attorney, Agent, or Firm*—Harness, Dickey & Pierce, PLC (57) ABSTRACT

A computer-implemented method and system is provided for delivering immediate (up to the minute) aviation weather information. A pilot makes a call to a single toll free number and specifies the location he wants to receive weather from. The system and method disambiguates the location and then checks to see if immediate weather data is already available within the system for that location. An informational message tailored to both the pilot and the location may be delivered to the user prior to the weather information.

If immediate weather data is already available in the described system, that weather data is communicated to the user via a computer-generated voice. If not, the system and method determines the voice phone number for the Automated Weather Observation System (AWOS) at the specified location, and connects the user by phone directly to the immediate weather information as generated by the AWOS at that location.

12 Claims, 6 Drawing Sheets

BUSINESS PROCESS FOR DISSEMINATING PILOT WEATHER DATA BY VOICE

CROSS-REFERENCE TO RELATED APPLICATIONS

This application is a continuation-in-part of U.S. patent application Ser. No. 10/978,872 filed on Oct. 29, 2004 now U.S. Pat. No. 7,088,241 and claims the benefit of U.S. Provisional Application No. 60/516,160, filed on Oct. 31, 2003. The disclosure of the above applications are incorporated herein by reference.

FIELD OF THE INVENTION

The present invention relates generally to computer-implemented immediate aviation weather delivery systems and computer-assisted immediate aviation weather delivery business methods.

BACKGROUND OF THE INVENTION

Obtaining current weather data at various locations, including destination and en route airports, is crucial for the operation of all types of aircraft. Early in the advent of aviation during the 1930's, weather data was gathered by observers at designated locations, usually airports. A typical observation included temperature, barometric pressure, wind speed and direction, visibility, cloud conditions, and information about currently occurring weather conditions such as rain or fog. The observation data was then sent down a common teletype circuit to Flight Service Stations for any pilots interested in conditions. With few modifications, this system continued largely unchanged until 1961 when an agreement was reached between the then new Federal Aviation Administration (FAA) and the National Weather Service (NWS) to allow Flight Service Station (FSS) briefers to interpret weather forecasts and charts for pilot briefings.

Hourly observations and occasional special observations, collectively called sequence reports, were transmitted using teletype communications until the mid 1970's. At that time, a new automated system was implemented to allow observations to be forwarded to a central location from which the observation could be obtained by any FSS. The mid 1970's also saw the beginning of a phase-out of local FSS stations in favor of "super FSS" stations with higher levels of automation. Consolidation concluded in the late 1990's, however observations were still largely hourly in frequency and flowed through a central clearing point. By the 1990's, the observation name was changed from sequence report to METAR and incorporated ICAO international reporting standards. With the consolidation of FSS stations, pilots were unable to visit their local FSS and instead had to rely on telephone briefings from one of the "super FSS" stations. The FAA also added Direct Access User Terminal (DUAT) online access for pilots only. DUAT provides exactly the same information available from FSS in the same time frame, but alleviates the need for a telephone call to FSS.

During the early 1980's, human weather observers were gradually replaced with automated weather reporting systems. Such a system, called Automated Weather Observation System (AWOS) is essentially a computer coupled with a bank of sensors for making and reporting observations. The observations are played continually via computer-generated voice over an assigned radio frequency. AWOS systems also have telephone lines that may be called to hear the computer generated voice observation. More recently systems known as Automated Surface Observation Systems (ASOS) have been deployed. The primary difference between a typical AWOS and an ASOS lies in the ASOS's enhanced observation capabilities. Otherwise, both the AWOS and ASOS report current observations via voice on a telephone line or over an assigned radio frequency. Additionally, larger airports with control towers often play recorded voice tape loops containing local airport notices and weather information over an assigned radio frequency. The weather information is still based on the most recent hourly observation. The tape loop system is known as Automated Terminal Information System (ATIS), and increasingly, is accessible through a telephone line. Within approximately the last ten years the weather portion of the message, previously recorded by a person, is being replaced by computer generated AWOS weather tagged to the end of the recording. Collectively, we will refer to all automated observation systems (AWOS, ASOS, and ATIS) as "AWOS" systems.

Starting in the 1980's, the FAA deployed about 600 AWOS stations nationwide. The federally deployed AWOS stations all have telephone lines and all report data in digital form to the FAA central location. However, since aviation weather data has an extreme bearing on aviation safety, many non-federal entities began to deploy AWOS systems on their own. Some of these report digital data, but many do not, leaving the radio broadcast and telephone line as the only way to obtain the observation. Today there are over 1,700 AWOS system nationally with more being added continually. A significant number of AWOS systems report their observations either through the National Oceanic and Atmospheric Administration (NOM) or FAA central computer systems for subsequent dissemination to interested parties; however, an observation can still be 20 minutes to an hour old by the time the end-user obtains it. Weather phenomenon like thunderstorms can build from non-existent to significant risk in as little as ten minutes, hence there is a need for the pilot to obtain real time weather easily, for any location. Although the World Wide Web has seen the growth of a number of weather oriented sites, including those that cater specifically to aviation weather data, all draw from the same central location whose observations, as noted above, can be up to an hour old. Furthermore, internet access has not penetrated significantly enough to be accessible from more than a very small percentage of airports. In contrast, telephony has penetrated to virtually ever corner of the country, especially when cellular telephones are considered. This is especially true of airports not associated with larger metropolitan areas where a current observation can be difficult to obtain. The embodiment of the present invention solves the currency problem for weather data in a way that only requires traditional telephone access.

In addition to immediate weather conditions, pilots often need predictive weather information such as Terminal Area Forecasts and Winds Aloft forecasts. These are largely prepared by the FAA and the NWS on a regular basis for distribution to pilots. The distribution channel was the teletype network described earlier. Flight Service Stations traditionally distribute these products by voice over the phone by having a trained briefer read and possibly interpret the reports. In more recent times, many of forecast products are available as text over the web. Therefore, unlike AWOS data, there are sources for forecast and other products, however there is no one source for all the products. As described earlier, the voiced-based cell phone has become the predominant terminal carried by pilots, therefore the embodiment of the present invention similarly delivers these products as voiced text. The means for obtaining the data is different since the products come from Internet locations, NWS and FAA repositories, and potentially other sources, but the delivery means, namely via voice and telephone, is the same. Instead of connecting with an outlet that provides current conditions in a voiced format, the system must retrieve textual data and turn it into voiced data locally so that it can be played to the user. For these products, parsing and interpretation is often required. For example, the Terminal Area Forecast is produced by the National Weather Service (NWS) in a coded format that not even all pilots can interpret. A system wishing to voice such information must do sophisticated parsing and turn the coded information into useful, plain English voiced data. For these products, parsing and interpretation is often required. For example, the Terminal Area Forecast is produced by the National Weather Service (NWS) in a coded format that not even all pilots can interpret. A system wishing to voice such information must do sophisticated parsing and turn the coded information into useful, plain English voiced data.

In addition to weather itself, certain kinds of meta-data are useful for the pilot. For example, given a certain location, it is useful to know the other nearby locations that also report weather, or, given a route, it is useful to know several weather reporting stations along the line of flight. This kind of data requires consulting a database and producing carefully crafted responses that are clear and concise.

SUMMARY OF THE INVENTION

The present invention addresses obtaining current weather data by using information obtained directly from the AWOS stations and other sources such as National Weather Service Internet repositories. Users call a central computer via telephone. The computer first prompts for the type of product desired. This can either be data from an AWOS or some other form of weather product such as a forecast. If the request is for current data from an AWOS, the computer prompts for the airport identifier for airport in question. After disambiguating the airport identifier from others that have the same telephone keypad sequence, the central computer consults a database of current observations directly from the AWOS. If available, the computer generates the voice observation for the user to hear. If a current observation is not available, the computer consults another database of telephone numbers for AWOS systems. Subsequently, the computer places a voice call to the AWOS and arranges for the calling user to hear in real-time the resulting voice report directly from the AWOS system. While it is technically feasible for a user to place a call directly to the AWOS himself, this assumes he knows the correct phone number. This invention includes maintaining a current database of AWOS telephone numbers, many of which are unpublished or difficult to find. In order to keep the AWOS phone numbers current, the current invention uses data gathered from the field to update the phone numbers. Current phone numbers are sent via email to the central computer. After a verification procedure, the database is updated with the new number. The email originates with an interested party, such as an airport manager, maintenance personnel or other parties in a position to know about changes at the AWOS.

Information not obtained from an AWOS includes, but are not limited to, Terminal Area Forecasts, Seven Day Forecasts, Winds Aloft Forecasts, Temperature Aloft Forecasts, AIRMET and SIGMETS AIRMETS, and Hazardous Weather Outlooks. If the user chooses one of these products, the computer still prompts for the airport location for the given product, however beyond this point, the process for non-AWOS products differs from the process described earlier. After disambiguating the airport identifier from others that have the same keypad sequence (as described earlier), the computer decides how and where to get the requested weather data. Additional products also often require further responses from the pilot. For example, for Winds Aloft, the altitude requested is required. For TAFs the time period is required. Generally, the computer proceeds as follows:

1. Determine where to get the product (proper URL, FTP or IP address on the network or other data source to consult)
2. Access the data (page or file) on the network.
3. Retrieve the product
4. Parse the retrieved data to extract the relevant data
5. Prompt for detailed information (such as time period or altitude)
6. Process the ASCII text for the data into spoken (voiced) words so the user can listen to it.
7. Play the resulting voiced data over the telephone link.

Not all weather products are produced for all locations. If a product is not specifically produced for the given location, the computer must decide from the locations for which the data is produced, which is the best alternate location to retrieve from. The computer does this by consulting a database. The decision may be based on closest geographical location. For example, the National Weather Service (NWS) does not issue a Terminal Area Forecast (TAF) for the airport at Mason Michigan. Lansing Mich., however, a larger airport only ten miles away, and does have a Terminal Area Forecast. Therefore, a request for the TAF for Mason results in the computer obtaining and voicing the TAF for Lansing (properly labeled as Lansing).

The next two sections describe how the current embodiment processes requests for two products, Terminal Area Forecasts (TAF) and Seven Day Forecasts.

Terminal Area Forecast Processing

The Terminal Area Forecast (TAF) is a forecast for an area on and around an airport which is issued periodically by the National Weather Service and segmented into time periods. Each period describes weather conditions and how they are expected to change at and near a given airport (terminal area). The TAF is critical to aircraft operation because it sets the legal parameters required for filing an instrument file plan. In addition to retrieving the appropriate TAF for the closest airport as described above, the computer software parses and segments the TAF into time periods. Experiments have shown that the entire TAF, played at once, is more than a pilot can assimilate and usually more than she needs. Any embodiment is required to translate from the NWS TAF format to a usable voiced set of words. The current embodiment not only does this translation but also separates the TAF into appropriate time periods in a most usable manner. Here is an example coded TAF for Lansing Mich.:

1. KLAN 091513Z 091512 22012G18KT P6SM BKN070 OVC300
2. FM1800 24012G20KT P6SM SCT060 SCT250
3. FM2100 24009KT P6SM BKN250
4. FM0000 25008KT P6SM BKN050 BKN120 OVC200
5. FM0300 29012G20KT 5SM TSRA BR BKN035CB OVC080
6. TEMPO 0304 2SM+TSRA BR BKN025CB OVC040
7. FM0400 34008KT 6SM−TSRA BR BKN040CB BKN120
8. FM0600 02008KT P6SM BKN050 BKN120
9. FM0900 04004KT P6SM SCT100 SCT250

As issued by the National Weather Service, the TAF is a continuous string (without the line numbers, which we have added for clarity). Line (1) introduces the TAF, provides time information, and sets the initial conditions. The time periods are generally introduced by the notation 'FM' and a "zulu" hour (Greenwich mean time). For example, line (5) says from 0300 Greenwich, the wind will be from 290 degrees at 12 knots, gusting to 20 knots. Visibility will be 5 miles and thunderstorms with rain is expected (TSRA). Mist (BR) will be present and the clouds will be broken at 3500 feet, overcast at 8000 feet. The clouds at 3500 feet will be cumulonimbus (thunderstorm) type clouds.

In this case, the computer software breaks the TAF into seven time periods from 'current period' through 0900 Greenwich. The computer software uses special processing to decide how many groups to create and what to include in each group. Time periods that are already older than the current time, that is, the time when the pilot is retrieving the forecast, are omitted from the segmented and parsed forecasts. Line (6) designates that from 0300 Greenwich to 0400 Greenwich conditions could be different (TEMPO), namely with 2 mile visibility and heavy thunderstorms. The software determines that this properly belongs with the periods before it, the 'FMO300' time periods and groups it accordingly.

From experiment, we know that pilots better comprehend time periods in the future relative to a base better than absolute time, where time zone becomes an issue. The computer software therefore prompts for the chosen time period in terms of "hours from now" rather than absolute time. Previous embodiments of the invention used absolute time periods. For example, for the TAF above, the computer generates the following dialog:
For the current forecast period, press 1
For the forecast period 3 hours from now, press 2
For the forecast period 6 hours from now, press 3
For the forecast period 9 hours from now, press 3
For the forecast period 12 hours from now, press 4.
For the forecast period 13 hours from now, press 5
For the forecast period 15 hours from now, press 6
For the forecast period 18 hours from now, press 7.

Assume the pilot presses '5' on her keypad. She will then hear:

"From zero three hundred zulu to zero four hundred zulu, wind two nine zero at twelve, gusting twenty. Visibility five. Thunderstorm with rain, mist; thirty five hundred broken—cumulonimbus—eight thousand overcast. Temporarily between zero three hundred zulu and zero four hundred zulu, visibility two, heavy thunderstorm with rain, mist. Twenty five hundred broken—cumulonimbus—four thousand overcast."

Notice that the "temporarily" period has been grouped into this time period.

The computer then replays the time period choices so the pilot can listen to other segments of the forecast. The above sample voicing is in zulu, or Greenwich mean time, but the computer stores the pilot's preferences and can voice the forecast in "local time". If, for example, the pilot preferred Eastern Standard Time, all of the 'zulu' references would be 'eastern standard' or 'eastern daylight' as required.

Seven Day Forecast Processing. Seven day forecasts are processed in a manner similar to TAFs with important differences. Seven day forecasts are available for all airports, and in fact, for all zip codes. Therefore, the computer has to convert airport location to zip code in order to process a forecast retrieval. Airport zip codes are not generally available so special processing is required to compute the closest zip code to an airport using latitude and longitude data. Once the proper zip code has been obtained, a request is made over the internet to the NWS servers. The resulting web page has to be carefully parsed to find the seven day forecast material. Next, the computer groups "Today" and "Tonight" sections together, and groups, for example, "Monday" and "Monday night" together. The pilot is prompted for the day she wishes. Experiments have show that "whole-day" forecasts are most useful and comprehensible when listening over a telephone. Finally, the forecast text is translated to voiced data and played to the user Meta-data Products. If it often useful for pilots to have meta-data that does not involved direct retrieval of weather products. For example, a pilot may wish to know all the weather reporting stations within a certain radius of a given location. Similarly, a pilot often needs to know several (say five) weather reporting locations along a route of flight. A variety of meta-data that can be derived from information known about weather locations and the parameters of a proposed flight are voiced in such a way as to be clear and concise.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT OF INVENTION

The following description of the preferred embodiment(s) is merely exemplary in nature and is in no way intended to limit the invention, its application, or uses.

Figure 1:
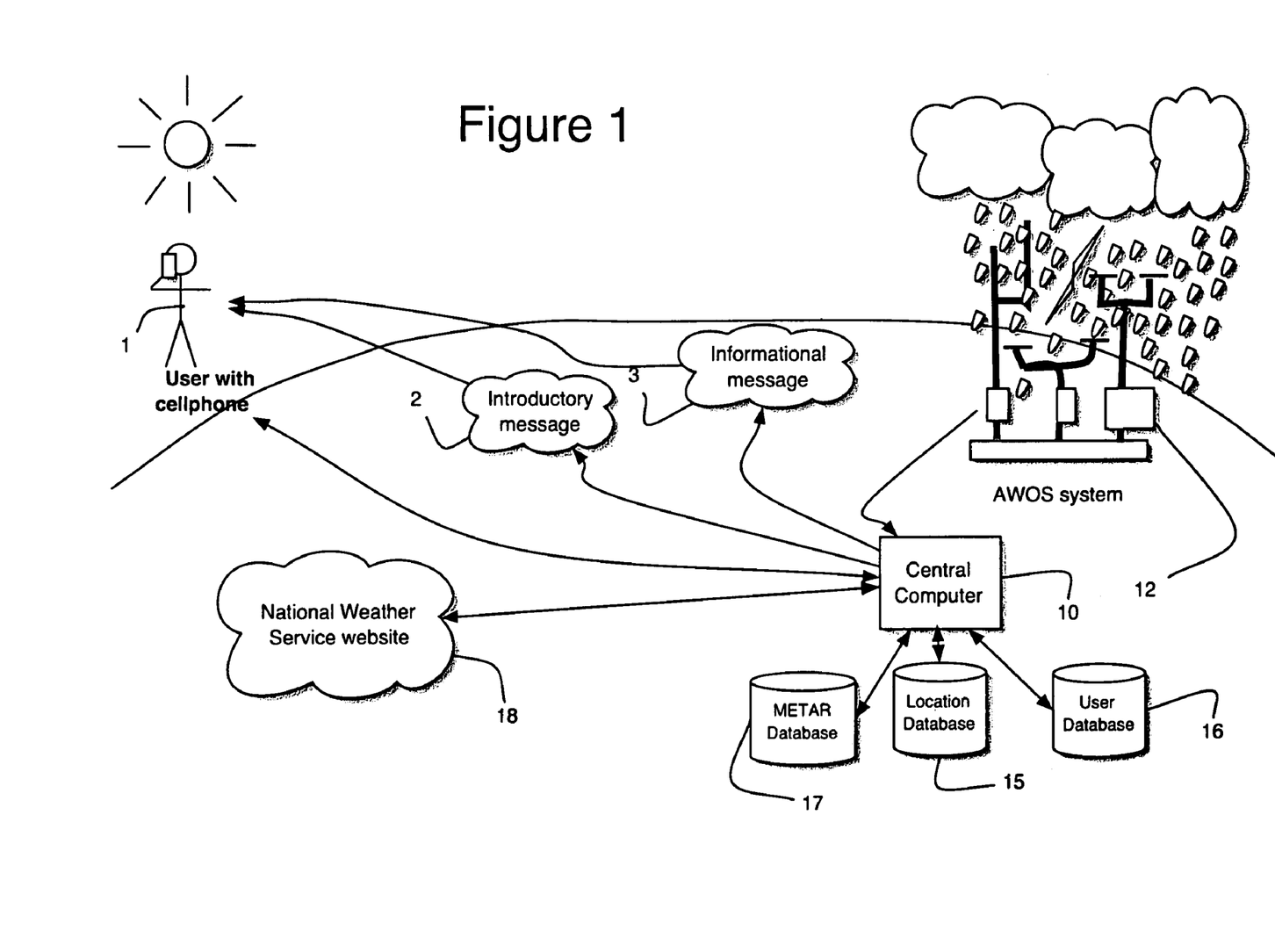
FIG. 1 is a diagram which represents the overall operation of the computer-implemented immediate aviation weather delivery system.

FIG. 1 presents the preferred embodiment of the invention. User 1 calls a central telephone number where the central computer 10 answers the call. Central computer 10 plays introductory messages 2 to the user and asks for the user to choose a specific weather product (for example, TAF, 7 day forecast, or AWOS). Once the specific weather product is chosen, the user is asked for an airport identifier. Location database 15 is consulted with the keypad sequence representing the requested identifier to determine the correct airport being requested. Central computer 10 has obtained the user's phone number from caller ID information (when available), and can additionally use this information to determine the likely airport the user is requesting. For example, an area code of 907 indicates the call is coming from Alaska, and Alaska is very likely the area the user is interested in. Detailed preferences for subscribing users are kept in user database 16, where information, such as how to decide disambiguation on a per user basis is kept.

Central computer 10 may also accept a special keypad sequence that maps to no specific airport, but rather to a special list of airports stored in location database 15. This capability is used primarily for special events where there is high interest in airports within a certain area, but whose location codes are otherwise unrelated. For example, a keypad code of "000" can map to five or ten airports around the Oshkosh, Wis. area during the EAA "AirVenture" convention. During AirVenture, Oshkosh becomes the busiest airport in the country, and the surrounding area experiences very high aircraft traffic.

The result of this process is presentation to user 1 of a list of potential airports. If the list is exactly one in length, this step can be skipped. The user 1 next chooses the location he is interested in from a numbered list presented by voice.

Central computer 10 next optionally plays informational message 3 to the user, which may be a commercial message, public service announcement, or some other form of message. The message is tailored because the central computer knows both the location being requested and potentially, the user's identity. For example, if the airport identifier DTW (Wayne Country Metropolitan airport, Detroit, Mich.) were entered, the message may concern something specific to the Detroit area. At the conclusion of informational message 3, (if a message is played) central computer 10 determines the appropriate source of information for the specific weather product the user has chosen.

If the user has chosen a TAF as the weather product of interest, central computer 10 determines the TAF location nearest to the user's chosen location, and retrieves an encoded TAF from the National Weather Service website 18. Central computer 10 then parses and interprets the encoded TAF into clear language as described above, and voices the interpreted information to the user.

If the user has chosen a 7 day forecast as the specific weather product, central computer 10 retrieves the encoded 7 day forecast for the chosen location from the National Weather Service website 18. Central computer 10 then parses and interprets the encoded 7 day forecast into clear language as described above, and voices the interpreted information to the user.

If the user has chosen an AWOS observation as the specific weather product, central computer 10 consults METAR database 17 to determine if there is a current observation. If so, the observation is composed into a voice message that is played to the user. If not, location database 15 is consulted to determine the telephone number of AWOS system 12. Central computer 10 dials the number and either transfers the call, bridges the user's call to the AWOS call, or otherwise plays the current AWOS system 12 generated voice to user 1. When user 1 hangs up, the system cycles back to the start to await another call.

Figure 2:
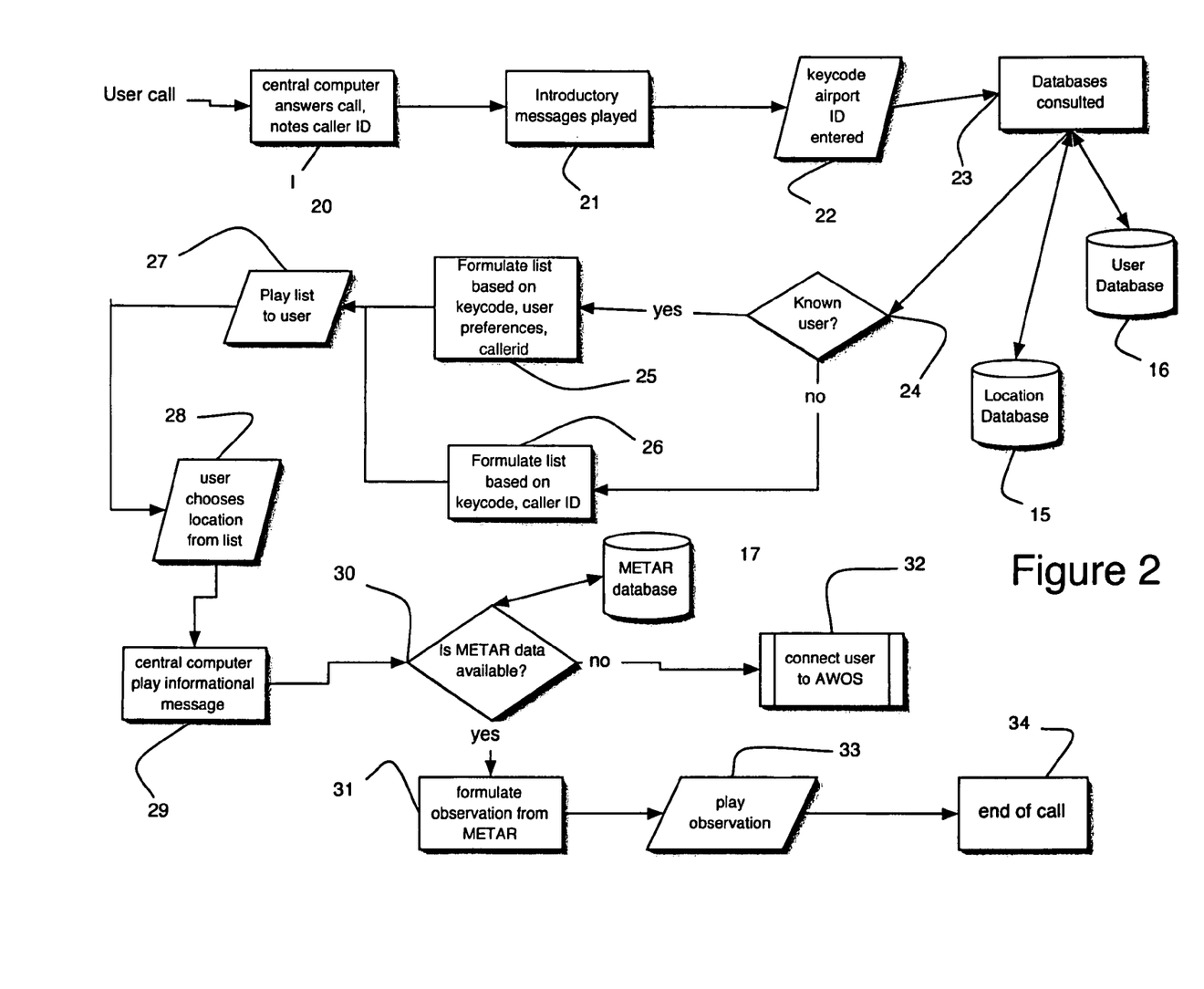
FIG. 2 is a flowchart which describes the operational steps involved in processing a user's request for immediate aviation weather when selecting an AWOS observation.

FIG. 2 shows the flow when a call is received from a user, and the user has chosen an AWOS observation as the specific weather product. In process block 20 the central computer answers the phone and saves the caller ID if it is available. In process block 21 the introductory message is played to the user, which includes the prompt for a choice of weather products, the user choosing an AWOS observation, and a request for the airport ID to be entered on the telephone keypad. In input block 22 the user enters a keycode that is translated to a location ID in process block 23 by consulting the location database. In decision block 24, if the user is known, based on caller ID and user database 16, a specially formulated disambiguation list is constructed in process block 25, otherwise, a disambiguation list is based on the keycode and possibly caller ID is constructed in process block 26. Disambiguation is required because a keycode sequence can represent many possible location IDs. For example, keycode "234" can represent "ADG", "BEG", or 25 other possible codes.

FIG. 2, process 25 depicts the construction of a list for the user to choose from based on preferences and keycode. The preferences may be set through a web interface based on the user's phone number or user ID. The preferences could include the restriction that only certain airports appear in the disambiguation list. The tailoring could be based on airport location (east of the Mississippi, none from Ohio, etc), or on airport class (none with runways shorter than 3500 feet, only ones with instrument approach procedures), or could be based on an explicit list specified by the user. The system may also keep track of the locations called most frequently by the user and tailor the disambiguation list based on the most likely locations to be requested. As above, this option would be enabled or disabled through a preference specified by the user, for example via a web screen. Similarly, the user may wish to store a set of custom lists from which to choose locations. Instead of an airport code, the user would enter one of the special list codes that would trigger the pre-stored list of locations. For example, code "001" may produce a list of five otherwise unrelated airports to chose from. All of these special capabilities are included in process 25 in FIG. 2.

In output block 27 the list constructed is played to the user. In input block 28 the user enters the list item number to identify a location. In process block 29, an informational message is optionally played to the user. Next, decision block 30 decides if digital METAR data is available from the AWOS. If it is, a voice observation is constructed in process block 31 and played in output block 33 followed by end of call processing in complex process block 34. If METAR data is not available, complex process block 32 connects to the AWOS.

Figure 3A:
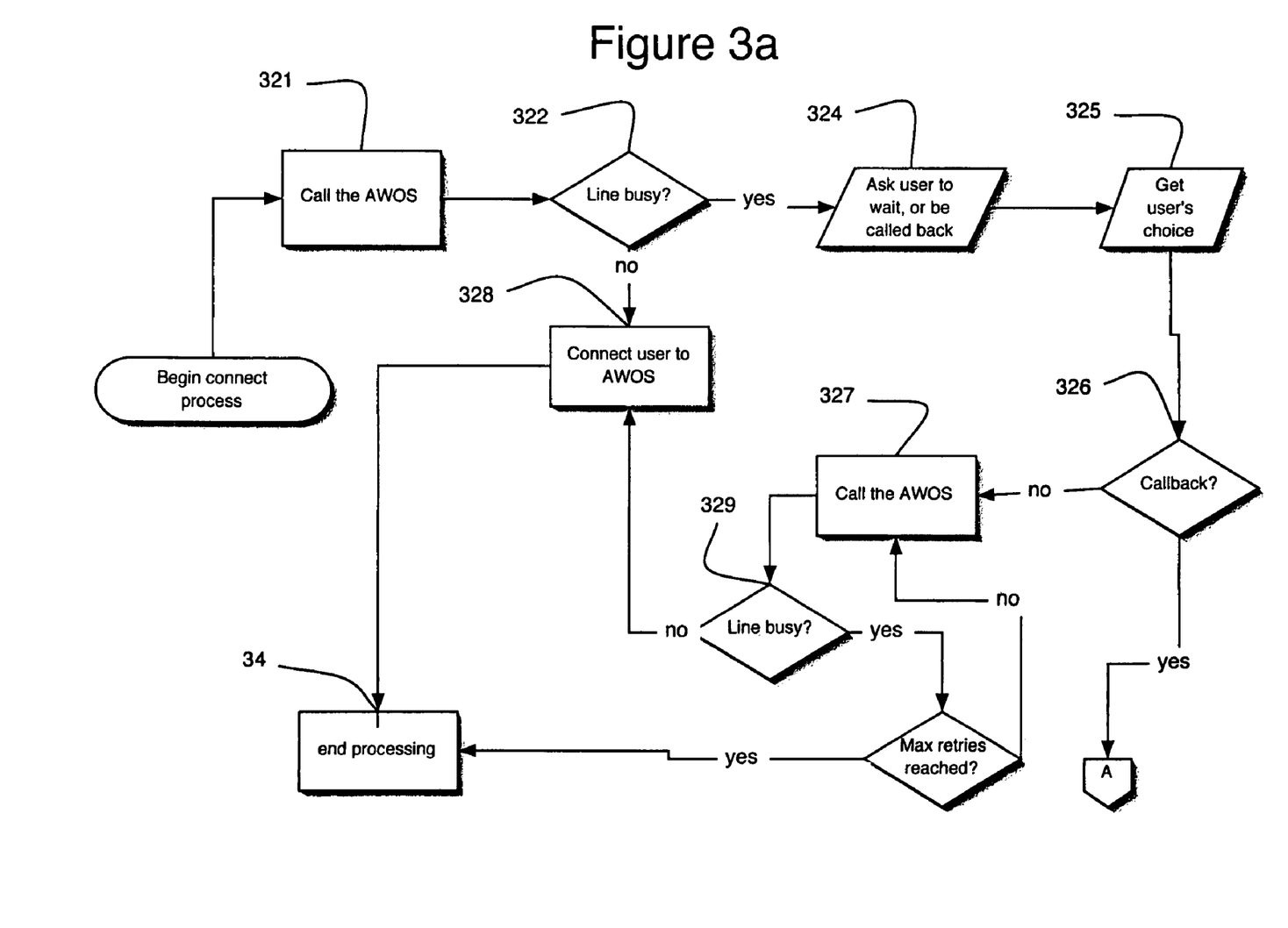
FIG. 3a is a flowchart which describes in detail the complex processing block 32 listed in FIG. 2.
Figure 3B:
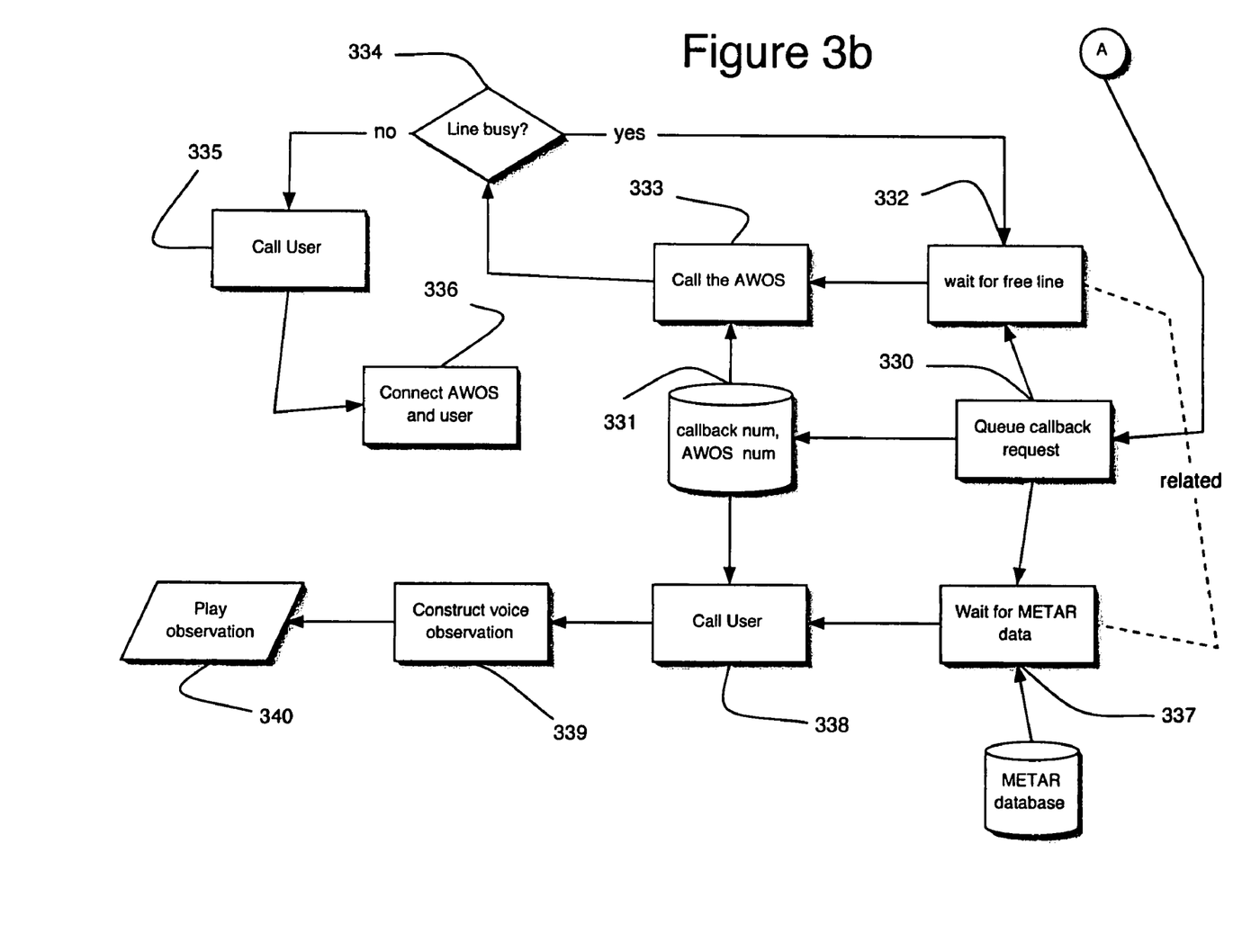
FIG. 3b is a flowchart which continues describing in detail the complex processing block 32 listed in FIG. 2.

FIG. 3a depicts the details of complex process block 32 in FIG. 2. Process block 321 call the AWOS telephone number. If decision in block 322 is not busy, the connection to between the user and the AWOS is completed in process block 328. Otherwise, the user is asked in output block 324 to either wait for the AWOS to become available or receive a callback when the AWOS is available. If the user's choice, obtained in input block 325 is to wait, a loop consisting of process block 327 and decision block 329 is entered until the line is available, at which time the user is connected to the AWOS in process block 328, or a maximum number of retries have been processed, in which case the call is terminated. If the user elects to receive a callback, the process continues in FIG. 3b via page connector A. In FIG. 3b, in process block 330, the request is queued to datastore 331 for periodic review (over a short period of time). Process block 332 waits for resources to become available to retry the call while process block 337 waits for the arrival of new METAR data. When line resources are available, the call is retried in process block 333 and decision block 334. During this time, the user is not connected to the system. If the AWOS is not busy, process block 335 calls the user while the AWOS is still connected, and process block 336 connects the user and AWOS. The connection remains until either the AWOS or user hangs up. If METAR data becomes available in process block 337, the user is called back in process block 338 by referring to datastore 331; a voice observation is constructed in process block 339 and played in output block 340.

Figure 5:
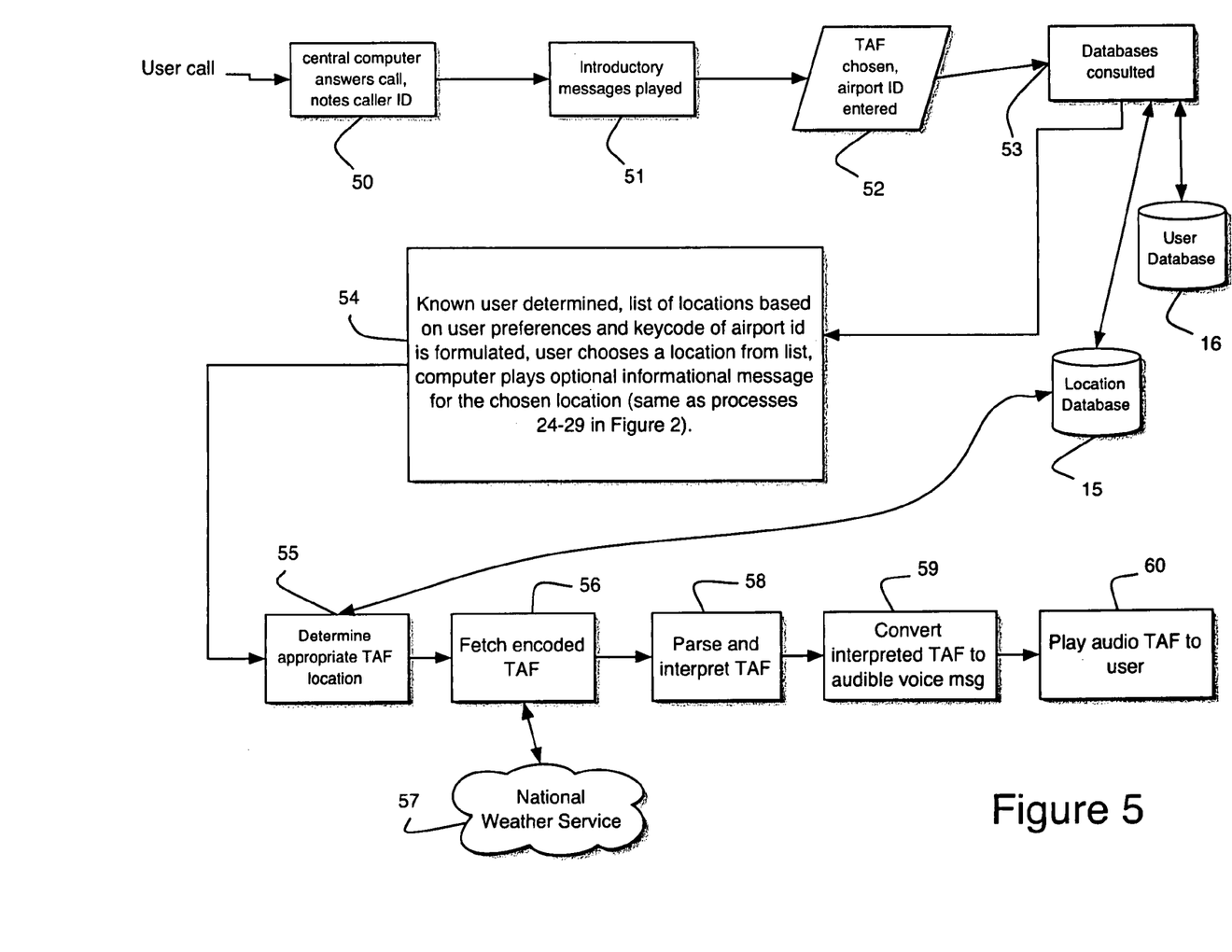
FIG. 5 is a flowchart which describes the operational steps involved in processing a user's request for immediate aviation weather when selecting a Terminal Area Forecast.

FIG. 5 depicts the flow when a call is received from a user, and the user has chosen a TAF as the specific weather product. In process block 50 the central computer answers the phone and saves the caller ID if it is available.

In process block 51 the introductory message is played to the user, which includes the prompt for a specific weather product, the user choosing a Terminal Area Forecast, and a request for the airport ID to be entered on the telephone keypad. In input block 52 the user enters a keycode that is translated to a location ID in process block 53 by consulting the location database.

Process block 54 embodies the same steps as blocks 24 through 29 in FIG. 2, wherein the caller is determined to be a known user or not, and if so, the user's preferences are invoked in order to present the user with a list of locations from which to choose, and an optional informational message is played for that location. After the user has chosen a location, and since at this point the user has already chosen that they are interested in a TAF (process block 52), process block 55 consults the Location database 15 in order to determine a location nearest the user's chosen location which has a TAF. Process block 56 fetches an encoded TAF from the National Weather Service website 57 which corresponds to the TAF location as determined from process block 55. Process block 58 parses, decodes, and interprets the encoded TAF from the NWS into understandable English and suitable time periods, as described above. Process block 59 converts the interpreted TAF into a spoken audible voice, which is played for the user in process block 60.

If the user's chosen weather product were a 7 day forecast, the processes would proceed as in FIG. 5, where the processes of determining which 7 day forecast to obtain, and decoding and interpreting the encoded information would be specific to 7 day forecasts rather than TAFS; otherwise the flow of information is similar.

In addition to the typical flow of information as depicted in FIGS. 2, 3a, 3b, and 5, the user may enter a code at any time to cause special actions to interrupt the current call processing. When the user enters a code, "#" for example, signifying a new location is desired, processing is interrupted, reset, and resumed at process block 21 in FIG. 2. This provides a means for a user to hear multiple locations with one call or to simply try an alternate location in the event of a called but busy AWOS location. Similarly, the user may enter a code, "*" for example, to signify entering a voice menu to change certain parameters for the duration of the current call. For example, a user may choose a different weather product at this time.

The user's preferences could also be used to request the central computer to call a user at a specified time with a specified set of observations. For example, a charter pilot flying a regular route at 8:00 AM each day may request the system to call him at 7:40 AM with a set of observations for the destination and airports along the flight route. The process would be essentially following that shown in FIG. 3b, except the entry would not be queued until just prior to the requested time.

Figure 4:
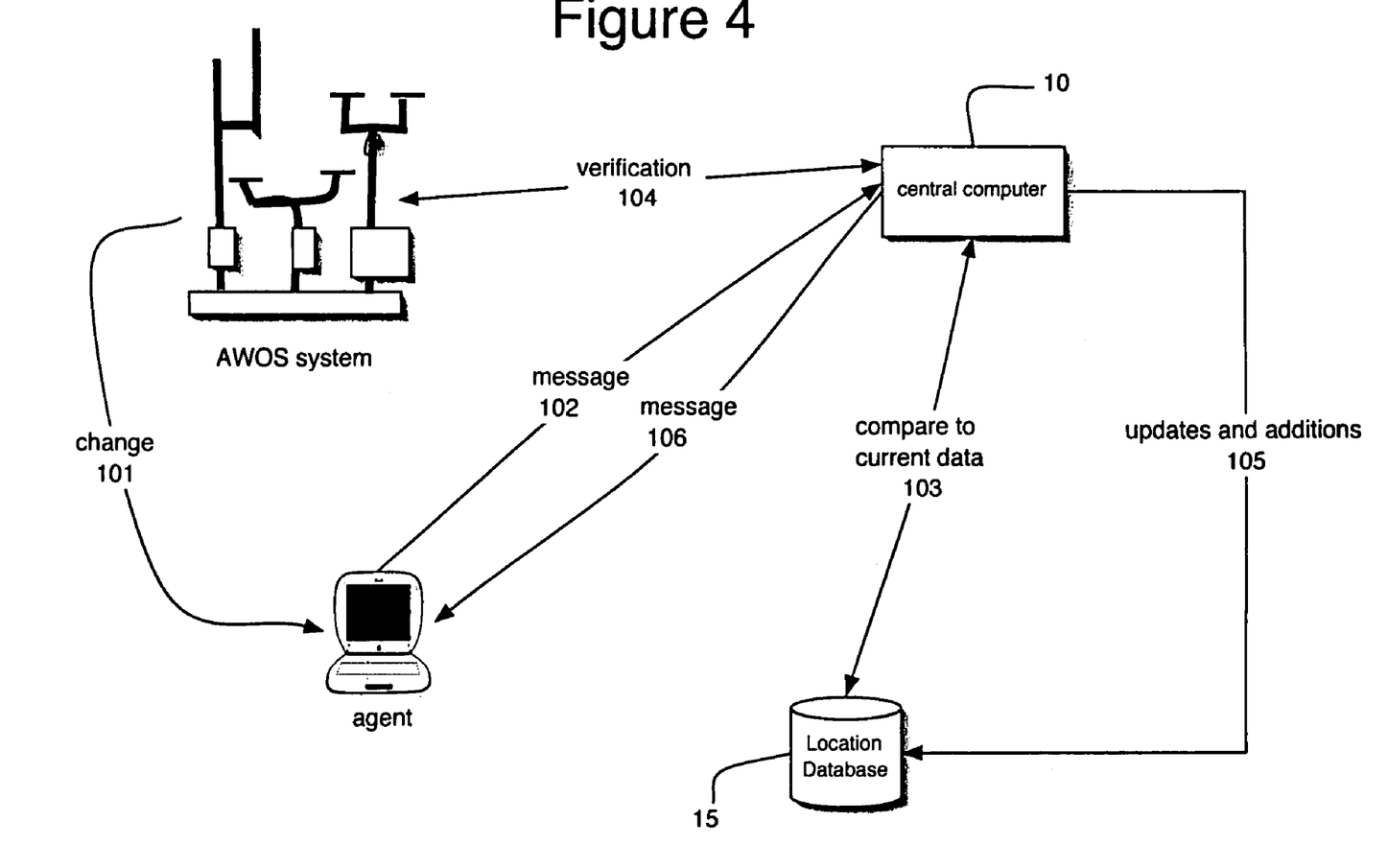
FIG. 4 is a diagram which describes the process of updating the Location Database.

FIG. 4 shows how the location database is kept current. Updating of the location database begins when an agent notices a change to the AWOS status, Subsequently, the agent sends message 102 to central computer 10. The source of the message can be email or a web transaction, and other forms of messages are possible. When message 102 arrives, the data, usually a new or modified phone number, is compared 103 to location database 15. If location database 15 is found to be correct, nothing more happens. If location database 15 appears to require any updates, verification 104 occurs to ensure accurate AWOS data. If accurate, updates 105 are made to location database 15.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A weather information system comprising:
    a call router capable of coupling an incoming call to a base telephone number with a weather information source;
    a database storing tuples that associate an airport identification indicia with at least one source of automated weather information associated with a locale where an airport is located;
    a management system coupled to said call router and to said database that operates:
    (a) to prompt an incoming caller to supply an airport identification indicia;
    (b) to selectively retrieve a source of automated weather information associated with said indicia; and
    (c) to selectively couple an incoming call with said retrieved source of automated weather information so that weather information is provided through the incoming caller's telephone device.

2. The system of claim 1 wherein said source of automated weather information is a source of weather forecast information.

3. The system of claim 1 wherein said source of automated weather information is an internet site.

4. The system of claim 1 further comprising parsing and decoding system configured to receive said automated weather information and to convert said information using a predetermined vocabulary and grammar associated with a spoken language.

5. The system of claim 4 wherein said automated weather information is expressed in Terminal Area Forecast messages.

6. The system of claim 4 wherein said spoken language is English.

7. The system of claim 1 further comprising parsing, decoding and speech system configured to receive said automated weather information and to convert said information into audible spoken language.

8. The system of claim 1 wherein said automated weather information is expressed in blocks of information spanning a first predetermined timeframe; and
    wherein said system further includes information segmentation mechanism that extracts a subset of said block of information corresponding to a second predetermined timeframe smaller than said first predetermined timeframe.

9. The system of claim 1 wherein said automated weather information is expressed in blocks of information spanning a first predetermined timeframe; and
    wherein said system further includes an information segmentation mechanism that operates:

(a) to prompt an incoming caller to supply a desired timeframe; and (b) to extract a subset of said block of information corresponding to said desired timeframe.

10. The system of claim 1 wherein said automated weather information is expressed in blocks of information spanning a first predetermined timeframe; and wherein said system further includes information segmentation mechanism that extracts a subset of said block of information corresponding to a second predetermined timeframe specified by the user.

11. The system of claim 10 wherein said segmentation mechanism is configured to define said second predetermined timeframe in terms of a time period in the future relative to a base time.

12. The system of claim 1 wherein said management system is further configured to selectively retrieve at least one source of automated weather information associated with each of a plurality of airport identification indicia.

* * * * *